United States Patent
Eklund (10) Patent No.: US 11,511,807 B2
(45) Date of Patent: Nov. 29, 2022

(54) ELECTRIC VEHICLE

(71) Applicant: Volvo Car Corporation, Gothenburg (SE)

(72) Inventor: Johan Eklund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 86 days.

(21) Appl. No.: 17/194,630

(22) Filed: Mar. 8, 2021

(65) Prior Publication Data

US 2021/0188359 A1 Jun. 24, 2021

Related U.S. Application Data

(63) Continuation of application No. 16/385,074, filed on Apr. 16, 2019, now Pat. No. 10,940,891.

(30) Foreign Application Priority Data

May 15, 2018 (EP) ..................... 18172508

(51) Int. Cl.
  *B62D 21/15* (2006.01)
  *B21C 23/14* (2006.01)
  (Continued)

(52) U.S. Cl.
  CPC .......... *B62D 21/155* (2013.01); *B21C 23/142* (2013.01); *B62D 29/008* (2013.01);
  (Continued)

(58) Field of Classification Search
  CPC ................ B62D 21/155; B62D 21/152; B62D 29/008; B21C 23/142; B60K 6/20; B60Y 2200/91; B60Y 2200/92
  See application file for complete search history.

(56) References Cited

U.S. PATENT DOCUMENTS 5,727,826 A * 3/1998 Frank ................... F16F 7/12
                                                                                    296/146.6
6,196,621 B1 * 3/2001 VanAssche ............ B62D 21/15
                                                                                    296/203.02
(Continued)

FOREIGN PATENT DOCUMENTS

CN          103155209 A      6/2013
CN          103562055 A      2/2014
(Continued)

OTHER PUBLICATIONS

Oct. 18, 2018 European Search Report issue on International Application No. EP18172508.
(Continued)

*Primary Examiner* — Lori L Lyjak
(74) *Attorney, Agent, or Firm* — Clements Bernard Walker; Christopher L. Bernard (57) ABSTRACT

An electric vehicle, including, a user compartment and a front section including a portion of a vehicle chassis, a crash absorbing member located in the front section and connected to the portion of the vehicle chassis, the crash absorbing member including a first extruded profile, preferably an aluminum profile, having a main extension direction in a transverse direction (y) of the vehicle, whereby the extrusion direction of the first extruded profile extends substantially in the transverse direction (y) of the vehicle, and wherein further the first extruded profile includes at least two cells (C1, C2) being defined by outer walls and at least one intermediate wall separating the at least two cells (C1, C2), wherein the at least one intermediate wall has a main extension direction in the transverse direction (y) and a second extension direction which extends substantially in a vertical direction (z).

19 Claims, 4 Drawing Sheets

(51) Int. Cl.
 *B62D 29/00* (2006.01)
 *B60K 6/20* (2007.10)

(52) U.S. Cl.
 CPC ............. *B60K 6/20* (2013.01); *B60Y 2200/91* (2013.01); *B60Y 2200/92* (2013.01)

(56) References Cited

U.S. PATENT DOCUMENTS

| | | | | |
|---|---|---|---|---|
| 6,561,571 | B1* | 5/2003 | Brennecke | B62D 29/002 293/109 |
| 7,374,219 | B2* | 5/2008 | Brennecke | B62D 29/002 296/187.02 |
| 8,353,545 | B1 | 1/2013 | Baldwin | |
| 2006/0181089 | A1* | 8/2006 | Andre | B62D 29/001 293/120 |
| 2014/0091584 | A1* | 4/2014 | McConnell | B60R 19/18 293/120 |
| 2015/0298633 | A1* | 10/2015 | Winberg | F16F 7/12 296/187.09 |
| 2015/0298741 | A1 | 10/2015 | Winberg et al. | |
| 2018/0022397 | A1* | 1/2018 | Richardson | B29C 69/02 296/187.03 |
| 2018/0029644 | A1* | 2/2018 | Li | B62D 25/00 |
| 2018/0100621 | A1* | 4/2018 | Tyan | B32B 25/06 |

FOREIGN PATENT DOCUMENTS

| | | | |
|---|---|---|---|
| CN | 104724175 A | 6/2015 | |
| DE | 19943773 A1 * | 3/2001 | ............. B62D 21/11 |
| DE | 10257259 A1 | 7/2004 | |
| DE | 102016123749 A1 | 7/2017 | |
| EP | 3293077 A1 | 3/2018 | |
| FR | 2741413 A1 | 5/1997 | |
| FR | 3000920 A1 | 7/2014 | |
| FR | 3046590 A1 * | 7/2017 | |
| FR | 3046590 A1 | 7/2017 | |
| KR | 101415464 B1 | 7/2014 | |
| KR | 20150069968 A | 6/2015 | |
| WO | 2016198758 A1 | 12/2016 | |

OTHER PUBLICATIONS

Nov. 4, 2021 Office action and search report issued in the corresponding CN application No. 201910378905.5.
Office action and search report issued in the corresponding CN application No. 201910378905.5.

* cited by examiner

ELECTRIC VEHICLE

CROSS-REFERENCE TO RELATED APPLICATION

The present disclosure is a continuation of co-pending U.S. patent application Ser. No. 16/385,074, filed on Apr. 16, 2019, and entitled "ELECTRIC VEHICLE," which claims the benefit of priority of co-pending European Patent Application No. 18172508.6, filed on May 15, 2018, and entitled "ELECTRIC VEHICLE," the contents of both of which are incorporated in full by reference herein for all purposes.

TECHNICAL FIELD

The present disclosure relates to an electric vehicle including a crash absorbing member.

BACKGROUND

Crash safety for vehicles is essential when designing new vehicles, especially passenger road cars. Vehicles are generally configured to handle different types of crashes in order to reduce the risk of passenger injuries, and also injuries or damage to external objects. Typical examples of safety devices in vehicles are seatbelts, airbags etc. In addition, when designing new vehicles, the vehicle chassis and its related components may also be configured in a way such that the vehicle is better suited for reducing the risk of passenger injuries during a collision/crash, and also injuries or damage to external objects. One example of such a component is a vehicle bumper which most often is intended for handling low impact collisions.

Another example of a vehicle component can be found in U.S. Pat. No. 8,353,545 B1, disclosing a crash structure which is interposed between a vehicle's bumper and a vehicle side rail. According to the abstract, the crash structure provides relative level loading in a structure that is easily removed and replaced during post-collision repairs.

The ongoing development of electric vehicles may lead to new challenges concerning crash safety.

SUMMARY

In view of the above, an object of the present invention is to provide an improved electric vehicle including a crash absorbing member. More particularly, an object of the present invention is to provide an electric vehicle which is better suited for handling front crashes with specific objects, especially poles or objects being similar to a pole.

According to a first aspect of the present invention, the object is provided by the subject matter as defined in the independent claim. Advantageous embodiments may be found in the dependent claims and in the accompanying description and drawings.

The objects are provided by an electric vehicle, which includes a user compartment, a front section located in front of and proximate to the user compartment, wherein the front section includes a portion of a vehicle chassis. Moreover, the electric vehicle includes a crash absorbing member located in the front section and connected to the portion of the vehicle chassis. The crash absorbing member includes a first extruded profile, preferably an extruded aluminium profile, having a main extension direction in a transverse direction of the vehicle, whereby the extrusion direction of the first extruded profile extends substantially in the transverse direction of the vehicle, and wherein further the first extruded profile includes at least two cells which are defined by outer walls and at least one intermediate wall separating the at least two cells, wherein the at least one intermediate wall has a main extension direction in the transverse direction and a second extension direction which extends substantially in a vertical direction in respect of the vehicle.

The expression "outer wall" as used herein may be defined as a wall of the first extruded profile which has at least partially, or mainly, a surface which faces an outer surrounding of the first extruded profile. The expression "intermediate wall" as used herein may be defined as a wall which has at least partially, or mainly, a surface which faces an inner area/space of the first extruded profile. The expression "cell" as used herein may be defined as a hollow space having a main extension direction, which is enclosed by one or more outer walls and/or intermediate walls. Optionally, two or more of the cells as disclosed herein may extend in parallel in respect of each other.

By the provision of embodiments disclosed herein, an improved electric vehicle is provided which can handle a front collision/crash such that vehicle user safety is improved. More particularly, it has been found that electric vehicles may be more vulnerable to specific front collisions when there is no internal combustion engine (ICE) placed in the front section of the vehicle. In fact, if the electric vehicle collides at its front section with a pole, or an object being similar to a pole, there may not be any ICE that could assist in absorbing the impact force from the collision with the pole. Hence, by the provision of the embodiments disclosed herein, an improved crash absorbing member is provided in the electric vehicle which will be able to absorb such impact forces from the pole in a controlled manner. A pole may be regarded as an object which is narrow in respect of the electric vehicle. The skilled person will of course realize that there are also other narrow objects which may result in a similar crash scenario when being hit by the electric vehicle at its front section. Moreover, by providing a first extruded profile as disclosed herein, a low weight crash absorbing member may be provided which also provides beneficial crash performance. The high crash performance is provided by the specific configuration of the first extruded profile. Also, in the case when the first extruded profile is an aluminium profile, the high crash performance may further be provided by the fact that aluminium is a ductile alloy/metal and the extruded profile is not as brittle as other alloys/metals may be. In comparison, it has been found that cast parts with similar strength would be more brittle compared to extruded profiles. It has further been found that high ductility is important in order to control and absorb the forces exerted on the crash absorbing member during a crash. The configuration of the cells of the first extruded profile as disclosed herein has also shown to provide an advantageous crash absorption capability, especially when crashing into poles and objects similar to poles. Still further, by providing the first extruded profile as disclosed herein, a simplified manufacturing may be realized providing reduced manufacturing cost.

Preferably, the first extruded profile is made of an aluminium alloy where aluminium is the predominant metal. Still optionally, the aluminium alloy may for example be selected from at least one of the following aluminium alloys: 6005A-T6 and 6063-T6. Still optionally, the aluminium alloy may further include at least one of the following element(s) (in wt %): 0-0.50 Manganese (Mn), 0-0.35 Iron (Fe), 0.40-0.70 Magnesium (Mg), 0.50-0.90 Silicon (Si), 0-0.20 Zinc (Zn), 0-0.10 Titanium (Ti), 0-0.30 Chromium (Cr), 0-0.30 Copper (Cu), 0-0.20 natural impurities, and the balance being Aluminium (Al).

The expression "electric vehicle" as used herein means a vehicle which is at least partly, or fully, propelled by an electric motor. Typically, the electric vehicle also includes a battery for powering the electric motor, but it may also be powered by external power sources being connected to the electric vehicle. For example, the electric vehicle may also include a pantograph and/or an inductive connection for transferring electric energy to the electric motor of the electric vehicle.

The expression "crash absorbing member" as used herein means a member of the electric vehicle which is intended for absorbing crashes, i.e. absorbing impact forces to the electric vehicle to thereby reduce the negative impacts of the collision for the user(s) in the electric vehicle and also for the external object which the vehicle crashes into. Moreover, the crash absorbing member may also be used for reducing the negative impact of the crash for other components in the vehicle. Thereby, fewer components may need to be repaired after a crash/collision. The absorption may advantageously be carried out by deformation of the crash absorbing member.

The expression "user compartment" as used herein means a compartment for user(s), such as a passenger or a driver, of the electric vehicle. The user compartment may therefore preferably include one or more vehicle seats for the user(s).

The expression "front section" of the electric vehicle as used herein refers to a section of the vehicle which is located in front of the user compartment of the vehicle along the longitudinal direction of the vehicle, i.e. in front of the user compartment in respect of a normal travel direction of the electric vehicle. The front section typically includes a hood, front wheels, wheel suspension etc.

The expression "extrusion" as used herein is a well-known production method and the expression "extruded profile(s)" as used herein is a well-known product which is the resulting product from the extrusion process. For example, extrusion may be defined as a process used to create objects of a fixed cross-sectional profile. In the extrusion process, a material, such as aluminium, may be pushed through a die of a desired cross-section, forming a profiled member. The material is extruded under plastic deformation which has been found to result in beneficial material properties for the first extruded profile of the crash absorbing member.

Moreover, the directions as used herein in respect of the electric vehicle, i.e. transverse, longitudinal and vertical direction, refers to the vehicle's different directions and may be defined as follows: the longitudinal direction is the direction in which the vehicle is intended to normally travel. The vertical direction refers to the vehicle's vertical direction, which may be a normal to a level ground surface when the vehicle is placed on the ground surface. The transverse direction is a direction which is perpendicular to the longitudinal direction and also to the vertical direction of the vehicle. Hence, the directions as used in respect of the other components may also be seen as when they are mounted into the electric vehicle. The directions may also be regarded as conforming with a Cartesian coordinate system, where the longitudinal direction may correspond to an x-direction, the transverse direction may correspond to a y-direction and the vertical direction may correspond to a z-direction of the Cartesian coordinate system.

Optionally, the first extruded profile may include at least three cells being defined by the outer walls and at least two intermediate walls separating the at least three cells pairwise from each other, wherein the at least two intermediate walls have respective main extension directions in the transverse direction and respective second extension directions which extend substantially in the vertical direction in respect of the vehicle. It has been found that configuring the first extruded profile with at least three cells and intermediate vertical walls provides improved crash absorbing capability, especially when crashing with a pole or an object being similar to a pole.

Optionally, the first extruded profile may include at least one additional cell being defined by portions of the outer walls and at least one additional intermediate wall, wherein said at least one additional intermediate wall has a main extension direction in the transverse direction and a second extension direction which extends substantially in a longitudinal direction in respect of the vehicle. Thereby, even further improved crash absorption capability may be provided. Still optionally, the first extruded profile may include a front side and a rear side, whereby the front side is located further towards the front of the vehicle with respect to the rear side, wherein the at least one additional cell is located at the front side. Still optionally, the at least one additional cell may be located on top of another of the cells in respect of the vertical direction of the vehicle, such that the first extruded profile substantially attains an L-shaped profile. It has been found that configuring the first extruded profile like this may even further improve the crash absorption capability when crashing with a pole or an object being similar to a pole. Moreover, an L-shape may be beneficial for space reasons in the front section of the electric vehicle.

Optionally, the crash absorbing member may further include two longitudinal members having respective main extension directions in a longitudinal direction of the vehicle, wherein the two longitudinal members are connected to the first extruded profile at respective transverse end portions thereof, and wherein the crash absorbing member is connected to the portion of the vehicle chassis by the two longitudinal members. Optionally, the two longitudinal members may be welded to the first extruded profile. Moreover, the two longitudinal members may also advantageously be extruded profiles, whereby the extrusions may extend in the longitudinal direction of the vehicle.

Optionally, the electric vehicle may further include a front subframe and the crash absorbing member may be connected to the vehicle chassis via the front subframe. Still optionally, the crash absorbing member may be a portion of the front subframe. Still optionally, the front subframe may include extruded aluminum profiles. A front subframe, which is connectable to vehicle bodies, such as passenger car bodies or chassis, is a well-known automotive component. Commonly, a front subframe is made by connecting different parts to thereby form a subframe structure, which may be square formed or rectangular formed and enclose an opening. The subframe may carry different parts of the vehicle, such as an internal combustion engine, steering shaft, wheel suspension etc. One example of a known subframe may be found in US 2015/0298741 A1, which discloses a subframe built by different parts, where some are extruded parts and the corner nodes are cast parts.

Optionally, the first extruded profile may be made in one single piece, preferably manufactured or extruded in one single piece. Making the first extruded profile in one single piece may reduce manufacturing costs, and may also provide improved crash absorbing capability compared to a profile which is made by more than one single piece. For example, a profile made by two or more pieces which are joined together by welding may result in a weaker design since the welds may be brittle and prone to break when exposed to large impact forces.

Optionally, the crash absorbing member may be located at a front end of the vehicle chassis. Still optionally, the crash absorbing member may be located at a bottom portion of the vehicle. Locating the crash absorbing member at the front end and/or at the bottom portion of the vehicle may result in further improved crash absorbing capability, especially when the electric vehicle hits a pole, or an object similar to a pole.

Optionally, the electric vehicle may further include a bumper for low impact forces which is located in front of the crash absorbing member. Hence, the bumper may be used for smaller impacts, such as parking accidents etc. The function of a bumper is well known for the skilled person and may therefore not be further described herein.

Optionally, the first extruded profile may have a length in the longitudinal direction of the vehicle and a height in the vertical direction of the vehicle, wherein a length/height ratio is above 2, such as 2-8 or 4-6. It has been found that providing the first extruded profile with the aforementioned dimensions results in a high absorption capability, especially for absorbing impact forces from a pole, or an object similar to a pole.

Optionally, the electric vehicle may be a road vehicle, a passenger road car, a pure electric vehicle, a hybrid vehicle and/or a pure electric passenger road car. A hybrid vehicle may be defined as a vehicle which may be propelled by more than one motor, especially at least one electrical motor and one ICE.

Optionally, the first extruded profile, which has a length in the longitudinal direction of the vehicle, may further have a width in the transverse direction of the vehicle, wherein a length/width ratio is above 0.3, such as above 0.4, 0.5, 0.6 or 0.7.

Optionally, the first extruded profile may extend between lateral end sides of the electric vehicle or along a substantial portion of the width of the electric vehicle, such as at least 70%, 80% or 90% of the total width of the front section of the electric vehicle. The total width may be defined as the largest width of the vehicle's front section.

Optionally, the first extruded profile may further be located in front of front wheels of the electric vehicle, or at least partly in front of the front wheels.

According to a second aspect of the present invention, the object is provided by a method of manufacturing an electric vehicle according to the first aspect of the present invention, wherein at least the first extruded profile is extruded. It shall be noted that anyone of the extruded profiles disclosed in relation to embodiments of the first aspect of the present invention may be produced by an extrusion process. All embodiments of the first aspect of the invention are applicable to all of the embodiments of the second aspect of the invention and vice versa, unless explicitly expressed otherwise. The skilled person will recognize that advantages of the first aspect are analogous to advantages of the second aspect, and vice versa.

BRIEF DESCRIPTION OF THE DRAWINGS

Exemplifying and preferred embodiments of the present invention will now be described more in detail, with reference to the accompanying drawings, wherein.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DESCRIPTION OF EMBODIMENTS

Figure 1:
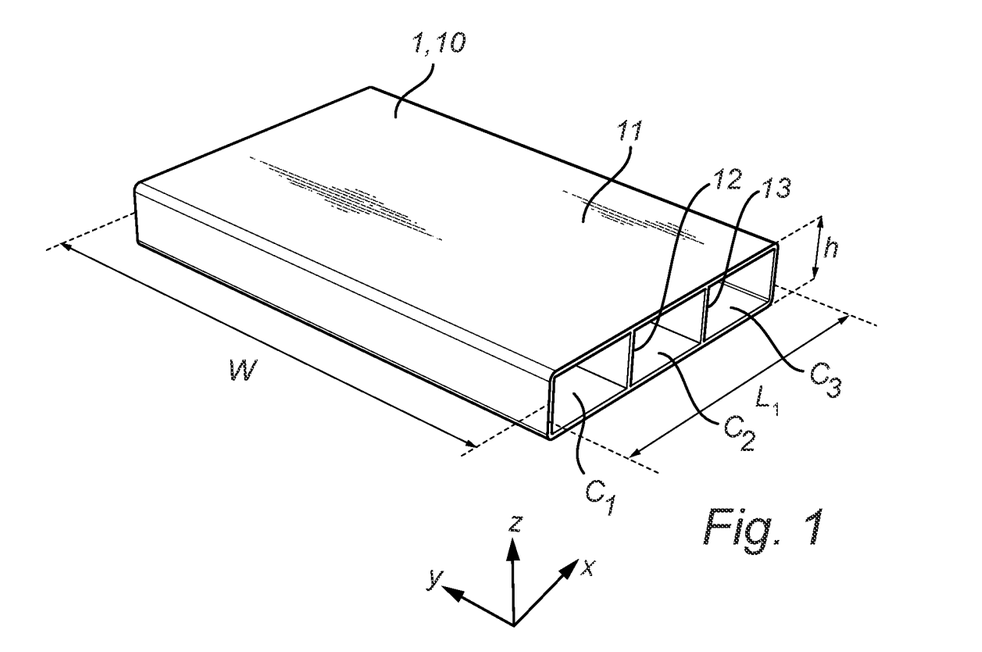
FIG. 1 shows a perspective view of a crash absorbing member according to an example embodiment of the present invention.

In FIG. 1, a crash absorbing member 1 according to an example embodiment of the present invention is depicted. The crash absorbing member 1 is a member of an electric vehicle 100 as for example the one shown in FIG. 6. The crash absorbing member 1 includes a first extruded aluminium profile 10 having a main extension direction w in a transverse direction y of the vehicle 100, see FIG. 6, whereby the extrusion direction of the first extruded aluminium profile 10 extends substantially in the transverse direction y of the vehicle 100. The embodiment thus illustrates an aluminium profile 10, but other materials may also be used which has material properties which are similar to aluminium, such as other ductile materials. Further, in the illustrated embodiment, the first extruded aluminium profile 10 includes three cells $C_1$, $C_2$ and $C_3$ which are defined by outer walls 11 and two intermediate walls 12 and 13 separating the three cells $C_1$, $C_2$ and $C_3$ pairwise, wherein the intermediate walls 12 and 13 have respective main extension directions in the transverse direction y and respective second extension directions which extend substantially in a vertical direction z with respect to the vehicle 100. When the first extruded aluminium profile 10 is mounted into the vehicle 100, the width w of the first extruded aluminium profile 10 extends substantially in the transverse direction y of the vehicle 100, the length $L_1$ of the first extruded aluminium profile 10 extends substantially in the longitudinal direction x of the vehicle 100 and the height h of the first extruded aluminium profile 10 extends substantially in the vertical direction z of the vehicle 100. For example, the length $L_1$, and also the lengths $L_2$ and $L_3$ as seen in FIGS. 2b and 3, may be from 180 to 300 millimeters, the width w may be from 500 to 600 millimeters and the height may be from 30 to 150 millimeters.

Figure 2A:
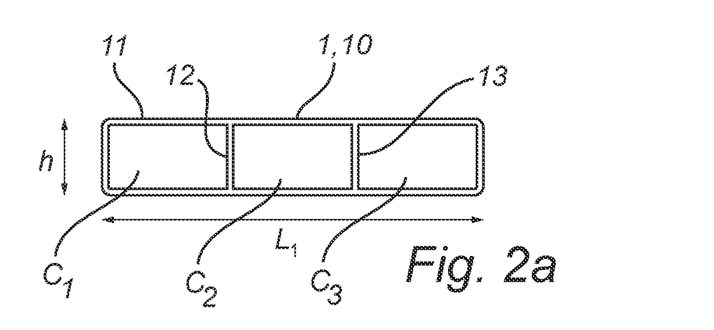
FIGS. 2a and 2b show cross sectional views of crash absorbing members according to example embodiments of the present invention.
Figure 2B:
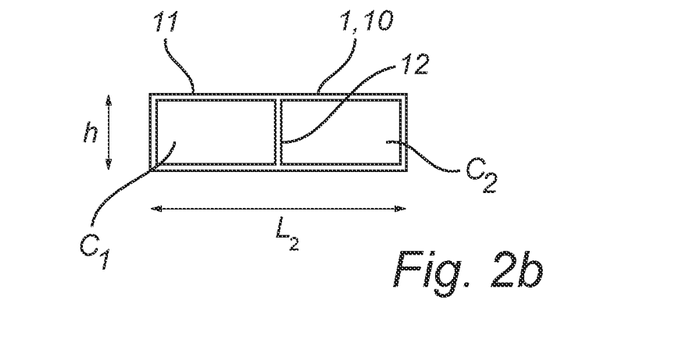
Figure 5:
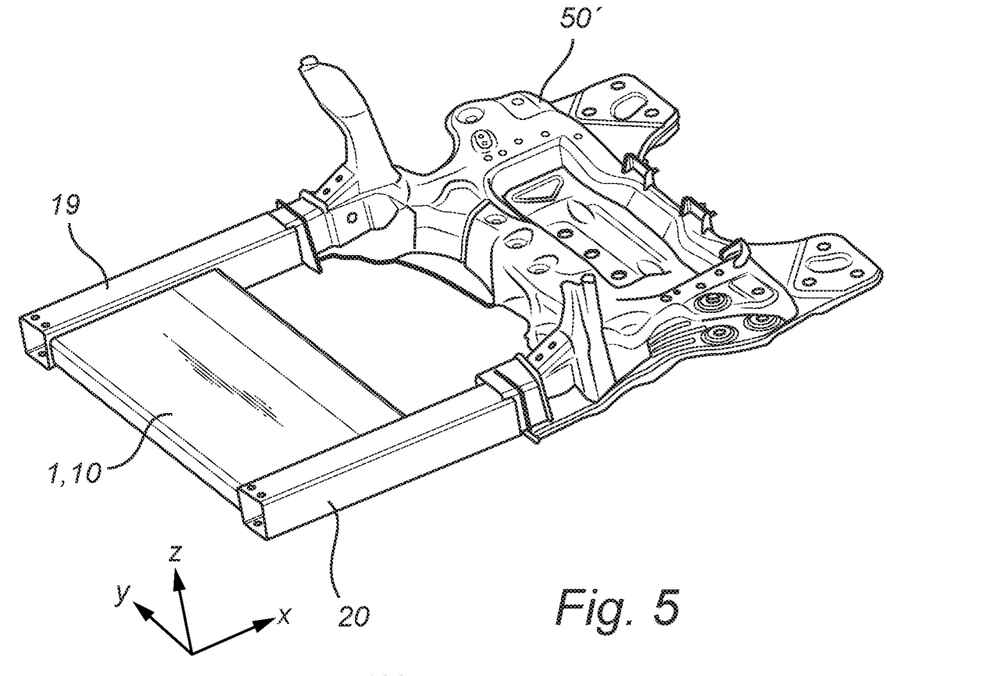
FIG. 5 shows a perspective view of a crash absorbing member being connected to a front subframe according to an example embodiment of the present invention.

FIGS. 2a and 2b show cross sections of two different crash absorbing members according to example embodiments of the present invention. The cross sections are defined by planes extending in the x and z directions. FIG. 2a is a cross sectional view of the crash absorbing member 1 as seen in FIG. 1, and FIG. 2b shows a cross section of another crash absorbing member 1 where the first extruded aluminium profile 10 includes two cells $C_1$ and $C_2$ separated by one intermediate wall 12. The embodiment in FIG. 2b has a length $L_2$. The outer walls 11 in both embodiments thus enclose two or more cells $C_1$, $C_2$ and $C_3$. In other words, the first extruded aluminium profile 10 of the crash absorbing member 1 may be regarded as a hollow or at least partly hollow profile. In one embodiment, the crash absorbing member 1 only includes the first extruded aluminium profile 10, but it may also include further members, such as the longitudinal members 19 and 20 as seen in FIG. 5. The configuration of the outer walls 11, the intermediate walls 12, 13 and the cells $C_1$, $C_2$ and $C_3$ has shown to provide a beneficial crash absorbing capability for the electric vehicle 100, and is especially suitable when the electric vehicle 100 does not have an ICE mounted in its front section 120.

Figure 3:
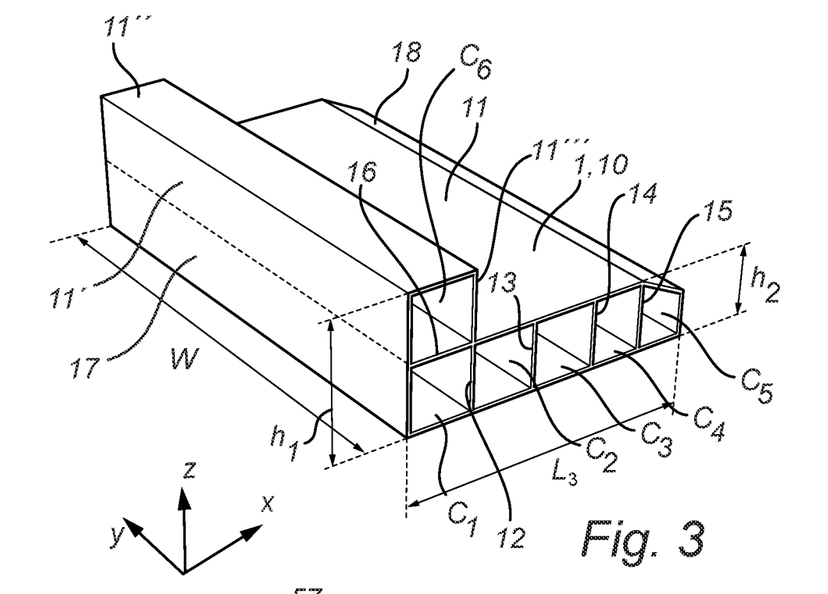
FIG. 3 shows a perspective view of another crash absorbing member according to an example embodiment of the present invention.

In FIG. 3, another example embodiment of a crash absorbing member 10 is depicted. In this embodiment, the first extruded aluminium profile 1 of the crash absorbing member 10 includes one additional cell $C_6$ which is defined by portions 11', 11" and 11'" of the outer walls 11 and by one additional intermediate wall 16, wherein the additional intermediate wall 16 has a main extension direction in the transverse direction y and a second extension direction which extends substantially in the longitudinal direction x with respect to the vehicle 100. Thereby, even further improved crash absorption capability may be provided. The embodiment in FIG. 3 has a length $L_3$. The first extruded aluminium profile 1 further includes a front side 17 and a rear side 18, whereby the front side 17 is located further towards the front of the vehicle 100 with respect to the rear side 18, wherein the additional cell $C_6$ is located at the front side 17. Moreover, the additional cell $C_6$ is located on top of another of the cells, namely $C_1$, with respect to the vertical direction z of the vehicle 100, such that the first extruded aluminium profile 1 substantially attains an L-shaped profile, as seen in a cross sectional view being defined by a plane extending in the x and z directions. It has been found that configuring the first extruded aluminium profile 1 like this may even further improve the crash absorption capability when crashing with a pole or an object being similar to a pole. Moreover, an L-shape may be beneficial for space reasons in the front section of the electric vehicle. Moreover, the first extruded aluminium profile 10 includes six cells, i.e. $C_1$, $C_2$, $C_3$, $C_4$, $C_5$ and $C_6$ in this example embodiment, whereby the cell $C_5$ at the outermost rear side 18 has an inclined outer wall to thereby better conform to the available space in the front section 120 of the vehicle 100. It shall be noted that the cells may be oriented differently in respect of each other depending on the available space in the electric vehicle 100, and also there may be fewer or more cells. However, providing a plurality of cells in the longitudinal direction x and possibly also two or more cells in at least one row in the vertical direction z has shown to result in a good crash absorbing capability. The L-shaped aluminium profile 10 has a height $h_1$ at the front side 17 and a height $h_2$ at the rear side 18, wherein the height $h_1$ is larger than the height $h_2$. For example, the height $h_1$ may be in the range from 60 to 150 millimeters and the height $h_2$ may be in the range from 30 to 60 millimeters.

Figure 4:
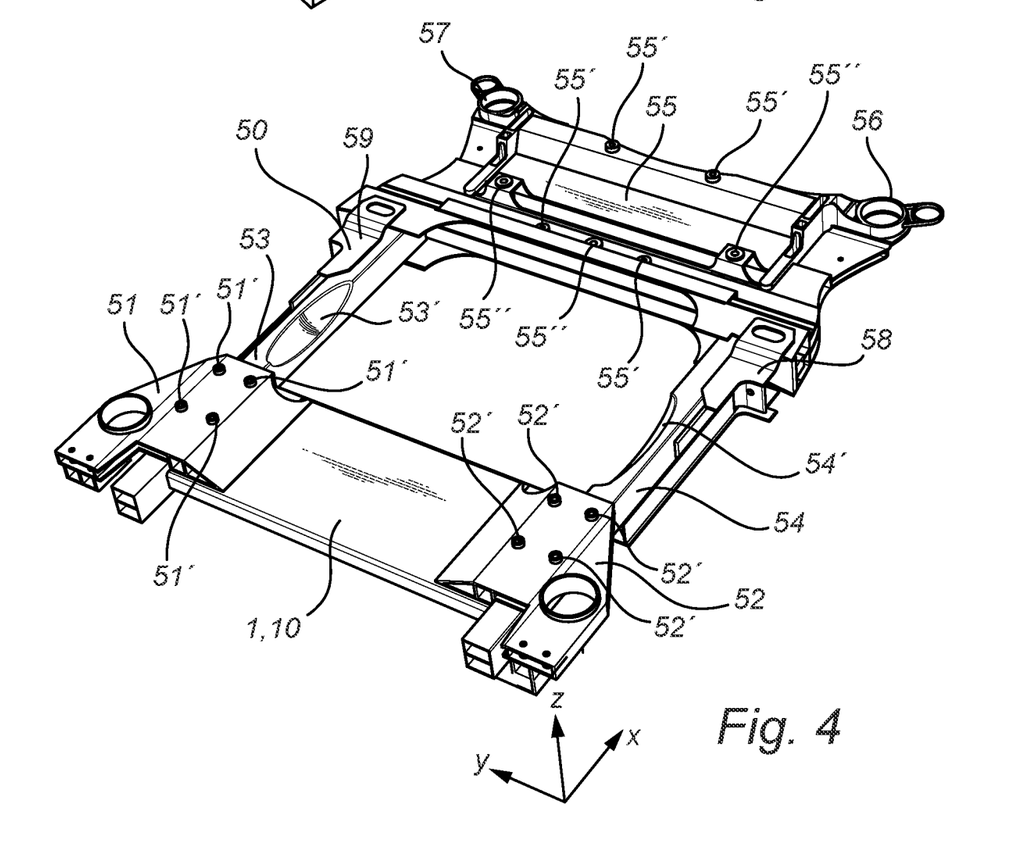
FIG. 4 shows a perspective view of a crash absorbing member being a portion of a front subframe according to an example embodiment of the present invention.

In FIG. 4, a front subframe 50 including a crash absorbing member 1 is depicted, i.e. the crash absorbing member 1 is in this case a portion of the front subframe 50. The crash absorbing member 1 includes a first extruded aluminium profile 10 including at least two cells (not seen) as disclosed herein, wherein the profile 10 extends between a first and a second front node, 51 and 52 respectively, of the front subframe 50. The front subframe 50 as shown is a square-shaped subframe enclosing an opening. A node as used herein may be defined as a corner member of the subframe 50 which connects other members of the subframe 50. The first and second front nodes 51 and 52 are extruded aluminium profiles, wherein the extrusion extends in the longitudinal direction x in respect of the vehicle 100. The extrusion may also extend in other directions, such as in the vertical direction z. However, providing the extrusion of the front nodes 51 and 52 in the longitudinal extension, i.e. in a different direction than for 10, has shown to be a beneficial complement to the extrusion direction of the first extruded aluminium profile 10. For example, the connection to the front nodes 51 and 52 may thereby be more robust and be able to better handle large forces, such as when the electric vehicle 100 hits a pole. The connections between the front nodes 51 and 52 and the first extruded aluminium profile may for example be made by welding.

The front nodes 51 and 52 may further include respective connections 51' and 52' for connecting the front subframe 50 to the electric vehicle 100, such as to the vehicle chassis 130 or any other member of the vehicle 100.

The front subframe 50 in FIG. 4 further includes a first and a second longitudinal member 53 and 54, which are relatively offset in the transverse direction y of the electric vehicle 100. The members 53 and 54 are connected to the first extruded aluminium profile 10 at respective end portions thereof. The connections may e.g. be made by welding. The first and second longitudinal members 53 and 54 are extruded aluminium profiles, whereby the extrusion extends in the longitudinal direction x. Moreover, the members 53 and 54 includes triggers 53' and 54', respectively, which are intended for allowing the front subframe 50 to fold or bend downwardly during a front collision of the vehicle 100, whereby the front subframe 50 may attain a substantial U-shape after the high impact collision. This has shown to be advantageous especially for electric vehicles when there is no ICE mounted in the front section 120 of the vehicle 100. The so called triggers 53' and 54' may be provided in different ways, such as providing one or more indentations/recesses or the like on the upper side of the longitudinal members 53 and 54. Hence, trigger(s), as used herein, may also be defined as a weakening zone(s).

Moreover, the front subframe 50 further includes a rear member 55 having a main extension in the transverse direction y and which is connected to the first and second longitudinal members 53 and 54 via respective rear connection members, 58 and 59. The rear member 55 is located offset from and opposite to the crash absorbing member 1 in the longitudinal direction x, and is also an extruded aluminium profile, whereby the extrusion extends substantially in the transverse direction y. The rear member 55 also includes a number of connections, 55' and 55", for connecting the front subframe 50 to other vehicle parts, such as to the vehicle chassis 130, steering gear (not shown) and wheel suspension (not shown). At the respective transverse end portions of the rear member 55 are a third and a fourth node, 56 and 57, located. The nodes 56 and 57 may also include connection means for connecting the front subframe 50 to e.g. the vehicle chassis 130. Preferably, the third and fourth nodes 56 and 57 are also extruded aluminium profiles, whereby the extrusion may preferably extend in the vertical direction z. Thereby, an improved connection to the rear member 55 may be accomplished since the extruded nodes 56 and 57 may provide larger surfaces suitable for welding the nodes 56 and 57 to the rear member 55. Moreover, the rear member 55 may also include one or more triggers (not shown) for folding the rear member 55 during a collision, which trigger(s) may be similarly configured as the triggers 53' and 54'.

All, or substantially all or at least a majority, of the aforementioned members of the front subframe 50 may hence be made of extruded aluminium profiles, which have been extruded in either one of the three directions, x, y and z, preferably at least one member in each direction x, y and z. This configuration has shown to provide a light weight structure with a high crash absorbing capability and also a cost efficient design.

Now turning to FIG. 5, where another example embodiment of a crash absorbing member 1, a first extruded aluminium profile 10 and a front subframe 50' is depicted. The crash absorbing member 1 is here connected to another type of front subframe 50', namely a front subframe 50' which is mainly made by pressed sheet metal. Moreover, the front subframe 50' may also be made at least partly, or completely, by cast part(s). The crash absorbing member 1 includes the first extruded aluminium profile 10 and further includes a first and a second longitudinal member, 19 and 20, having respective main extension directions in a longitudinal direction x, wherein the first and second longitudinal members 19 and 20 are connected to the first extruded aluminium profile 10 at respective transverse end portions thereof. The longitudinal members 19 and 20 are connected to the front subframe 50', which in turn is intended to be connected to the vehicle chassis 130, see FIG. 6. The longitudinal members 19 and 20 may be connected directly to the front subframe 50', but they may also be connected via additional consoles, or brackets, (not shown) which may be welded to the longitudinal members 19 and 20 and then attached to the front subframe 50' by e.g. screws, bolts or the like. The longitudinal members 19 and 20 are also extruded aluminium profiles, wherein the extrusion extends substantially in the longitudinal direction x. Moreover, the longitudinal members 19 and 20 may be connected to the first extruded aluminium profile 10 by for example weld seams. The connection to the front subframe 50' may also be made by welding, or by any other suitable means recognized by the skilled person, such as providing bolts, rivets etc., or any combination thereof.

Figure 6:
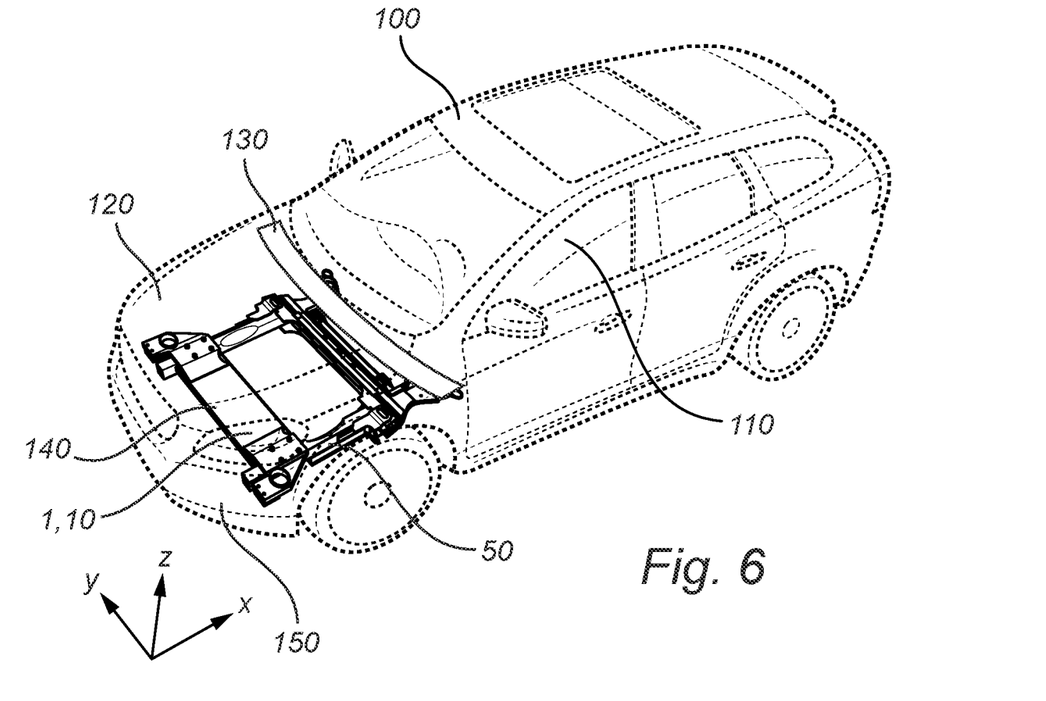
FIG. 6 shows an electric vehicle according to an example embodiment of the present invention.

FIG. 6 depicts an electric vehicle 100 according to an example embodiment of the present invention. The electric vehicle 100 includes a user compartment 110 and a front section 120 located in front of and proximate to the user compartment 110. The front section 120 includes a portion of a vehicle chassis 130, wherein a crash absorbing member 1 is located in the front section 120 and is connected to the portion of the vehicle chassis 130 via a front subframe 50 as for example shown in FIG. 4. The crash absorbing member 1 includes a first extruded aluminium profile 10 having a main extension direction in the transverse direction y of the vehicle 100, whereby the extrusion direction of the first extruded aluminium profile 10 extends substantially in the transverse direction y of the vehicle 100, and wherein further the first extruded aluminium profile 10 includes at least two cells c1 and c2, see e.g. FIG. 1, being defined by outer walls 11 and at least one intermediate wall 12 separating the at least two cells, wherein the at least one intermediate wall 12 has a main extension direction in the transverse direction y and a second extension direction which extends substantially in the vertical direction z in respect of the vehicle 100. The crash absorbing member 1 is here located at a front end 140 of the vehicle chassis 130, and more particularly at a front end of the electric vehicle 100, such that it will be able to absorb forces from a front crash, especially when hitting a pole or an object being similar in shape to a pole. The crash absorbing member 1 may also be located at a bottom portion of the vehicle 100. The bottom portion may for example be defined as a portion extending in the vertical direction z between a lowest point of the front section 120 and halfway to a highest point of the front section 120. A bumper 150 is also located in front of the crash absorbing member 1. The bumper 150 is configured for accommodating low impact collisions and the crash absorbing member is suited for larger impact forces to the electric vehicle 100. Purely by way of example, the electric vehicle 100 may be a fully or partly autonomous vehicle, where at least one of a steering operation and a speed control operation is performed without any human involvement. The electric vehicle 100 may also include a driver assistance functionality, where steering and/or speed assistance is performed by for example an electronic control unit (not shown) of the vehicle 100.

Figure 7:
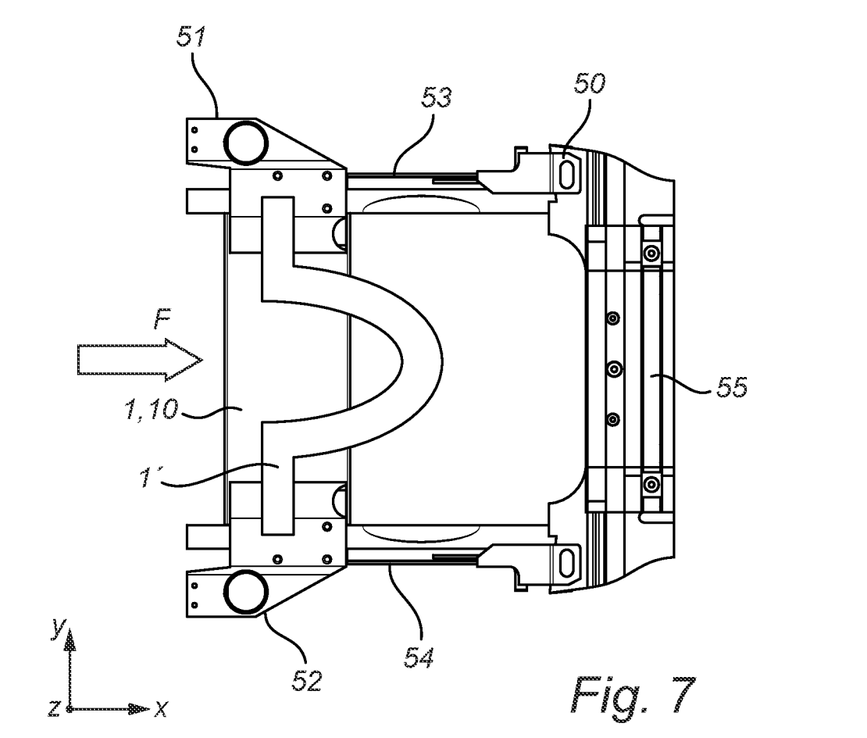
FIG. 7 shows a view from above of a crash absorbing member which has been exposed to an impact force.

FIG. 7 depicts a top view of the crash absorbing member 1 and the front subframe 50 in FIG. 4. The view is a view seen from above, i.e. in the z direction. The arrow F indicates that an impact force acts on the crash absorbing member 1. The force F is here a result of an impact with a pole, or an object being similar to a pole. As a result of the impact force F, the crash absorbing member 1 has deformed such that it attains a U-shaped form 1' as illustrated in FIG. 7. By the provision of the present invention as disclosed herein, improved crash absorbing capability may be realized, especially when the electric vehicle 100 crashes into a pole. The first extruded aluminium profile 10 of the crash absorbing member 1, 1' is preferably welded to the front subframe 50. The welds (not shown) are preferably mainly extending in the longitudinal direction x and connect the member 10 to the nodes 51 and 52, and optionally also to the members 53 and 54, thereby resulting in relatively long weld seams on each end portion of the first extruded aluminium profile 10 which are robust and minimize the risk that the first extruded aluminium profile 1 will dissociate from its connection to the front subframe 50 during a collision.

The invention is not limited to the embodiments described herein. It would be evident for the skilled person that other embodiments and modifications to the embodiments specified hereinabove are also possible within the scope of the claims.

The invention claimed is:

1. A crash absorbing member that absorbs forces from a front crash for a vehicle, the crash absorbing member is located in a front section of a vehicle chassis at a bottom portion of the vehicle, and connected to a portion of the vehicle chassis, said crash absorbing member comprising a first extruded profile, having a main extension direction in a transverse direction (y) of the vehicle, wherein further said first extruded profile comprises at least two cells (C1, C2) being defined by outer walls and at least one intermediate wall separating the at least two cells (C1, C2), wherein said at least one intermediate wall has a main extension direction in the transverse direction (y) and a second extension direction which, when the crash absorbing member is mounted in the vehicle, extends substantially in a vertical direction (z) in respect of the vehicle.

2. The crash absorbing member according to claim 1, wherein the first extruded profile comprises at least three cells (C1, C2, C3) being defined by the outer walls and at least two intermediate walls separating the at least three cells (C1, C2, C3) pairwise from each other, wherein said at least two intermediate walls have respective main extension directions in the transverse direction (y) and respective second extension directions which extend substantially in the vertical direction (z).

3. The crash absorbing member according to claim 1, wherein the first extruded profile comprises at least one additional cell (C6) being defined by portions of the outer walls and at least one additional intermediate wall, wherein said at least one additional intermediate wall has a main extension direction in the transverse direction (y) and a second extension direction which extends substantially in a longitudinal direction (x) in respect of the vehicle.

4. The crash absorbing member according to claim 3, wherein the first extruded profile comprises a front side and a rear side, wherein the front side is located further towards the front of the vehicle with respect to the rear side, wherein said at least one additional cell (C6) is located at a front side.

5. The crash absorbing member according to claim 4, wherein the at least one additional cell (C6) is located on top of another of said cells (C1) in respect of the vertical direction (z), such that the first extruded profile substantially attains an L-shaped profile.

6. The crash absorbing member according to claim 1, wherein the first extruded profile is made in one single piece.

7. The crash absorbing member according to claim 1, wherein the first extruded profile is an extruded aluminum profile.

8. The crash absorbing member according to claim 1, wherein the first extruded profile has a length (L) in the longitudinal direction (x) and a height (h) in the vertical direction, wherein a length/height ratio is above 2.

9. The crash absorbing member according to claim 1, wherein the crash absorbing member is connectable to the portion of the vehicle chassis by two longitudinal members having respective main extension directions in a longitudinal direction (x) of the vehicle, said two longitudinal members being connectable to the first extruded profile at respective transverse end portions thereof.

10. The crash absorbing member according to claim 1, wherein the crash absorbing member is connected to the vehicle chassis via a front subframe of the vehicle.

11. The crash absorbing member according to claim 1, wherein the crash absorbing member is a portion of a front subframe of the vehicle.

12. An electric vehicle comprising a crash absorbing member according to claim 1, wherein the vehicle is a road vehicle, a passenger road car, a pure electric vehicle, a hybrid vehicle and/or a pure electric passenger road car.

13. A front subframe for an electric vehicle comprising a crash absorbing member according to claim 1.

14. The front subframe according to claim 13, wherein the front subframe comprises extruded aluminum profiles.

15. The front subframe according to claim 13, wherein the first extruded profile of the crash absorbing member extends between first and second front nodes, of the front subframe.

16. The front subframe according to claim 15, wherein the front nodes further include respective connections for connecting the front subframe to the vehicle.

17. The front subframe according to claim 13, comprising two longitudinal members having respective main extension directions such that the main extension directions are in a longitudinal direction (x) of the vehicle, said two longitudinal members being connected to the first extruded profile at respective end portions thereof.

18. The front subframe according to claim 17, wherein the longitudinal members include triggers which are intended for allowing the front subframe to fold or bend downwardly during a front collision of the vehicle.

19. The front subframe according to claim 13, wherein the front subframe comprises pressed sheet metal.

* * * * *